US00RE35012E

United States Patent [19]

Takamura et al.

[11] E Patent Number: Re. 35,012

[45] Reissued Date of Patent: Aug. 8, 1995

[54] SPARK PLUG FOR INTERNAL COMBUSTION ENGINES HAVING AN ALLOY LAYER BETWEEN THE ELECTRODES AND TIP ENDS

[75] Inventors: Kozo Takamura; Yasuyuki Sato; Kanji Higuchi, all of Kariya, Japan

[73] Assignee: Nippondenso Co., Ltd., Kariya, Japan

[21] Appl. No.: 73,680

[22] Filed: Jun. 9, 1993

Related U.S. Patent Documents

Reissue of:

[64] Patent No.: 4,581,558
Issued: Apr. 8, 1986
Appl. No.: 450,801
Filed: Dec. 17, 1982

[30] Foreign Application Priority Data

Jan. 14, 1982 [JP] Japan ..... 57-4050

[51] Int. Cl.[6] ..... H01T 13/20; H01T 13/32

[52] U.S. Cl. ..... 313/141; 313/142

[58] Field of Search ..... 313/136, 141, 141.1, 313/142, 144

[56] References Cited

U.S. PATENT DOCUMENTS

| | | | |
|---|---|---|---|
| 2,391,456 | 1/1944 | Hensel | 313/136 X |
| 2,416,107 | 2/1947 | Litton | 313/136 X |
| 3,548,239 | 12/1970 | Eaton | 313/141 X |
| 3,984,717 | 10/1976 | Romanowski et al. | 313/141 |
| 4,488,081 | 12/1984 | Kondo et al. | 313/141 |

*Primary Examiner*—Sandra L. O'Shea
*Attorney, Agent, or Firm*—Cushman, Darby & Cushman

[57] ABSTRACT

A spark plug for an internal combustion engine including a center electrode, an earth electrode, a metal tip joined by welding to an ignition section of at least one of the center electrode and the earth electrode, and an alloy layer located at a welding portion between the metal tip and the at least one electrode. The metal tip is formed of material highly resistant to heat and wear which is distinct in the coefficient of thermal expansion from the material of the electrodes. The alloy layer is formed to have a thickness of at least about 10$\mu$, so as to avoid the rupture of the metal tip along the surface thereof adjacent to the welding portion.

15 Claims, 3 Drawing Sheets

SPARK PLUG FOR INTERNAL COMBUSTION ENGINES HAVING AN ALLOY LAYER BETWEEN THE ELECTRODES AND TIP ENDS

Matter enclosed in heavy brackets [ ] appears in the original patent but forms no part of this reissue specification; matter printed in italics indicates the additions made by reissue.

BACKGROUND OF THE INVENTION (1) Field of the Invention

This invention relates to a spark plug for internal combustion engines, and more particularly it is concerned with a spark plug including electrodes of increased resistance to wear.

(2) Description of the Prior Art

In one type of spark plug known in the art, a center electrode of the spark plug has joined thereto by welding a metal tip formed of precious metal, such as platinum, or other metal of high resistance to heat and wear.

The ignition section of a spark plug is exposed to combustion gas and hence is sensitive to changes in temperature caused by various driving conditions of an internal combustion engine. The temperature is greatly governed by driving conditions and it is relatively low when the engine is driven for rotation under low load but rises to a markedly high level when the engine is driven for rotation at high speed under high load. Thus the spark plug of the aforesaid type of the prior art has had the disadvantage that due to differences in the coefficient of thermal expansion, thermal stresses develop in the center electrode and the metal tip joined thereto by welding. The thermal stresses are in proportion to temperature, and act repeatedly under conditions of repeatedly rising and falling temperature. The thermal stresses apply an excessively high load to the metal tip, causing rupture of the metal tip to occur.

SUMMARY OF THE INVENTION

It is a primary object of the present invention to provide a spark plug for an internal combustion engine of prolonged service life which is capable of reducing thermal stresses applied to a metal tip due to differences in the coefficient of thermal expansion between the metal tip and a center electrode and/or an earth electrode to which the metal tip is joined by welding, to thereby avoid rupture of the metal tip.

According to the invention, there is provided a spark plug for an internal combustion engine comprising a center electrode, an earth electrode, a metal tip joined by welding to an ignition section of at least one of the center electrode and the earth electrode, the metal tip being highly resistant to heat and wear and formed of material having the coefficient of thermal expansion different from that of the material forming the electrodes, and an alloy layer located at a welding portion between the abovementioned at least one electrode and the metal tip and having a thickness of at least about $10\mu$.

Additional and other objects, features and advantages of the invention will become apparent from the description set forth hereinafter when considered in conjunction with the accompanying drawings.

BRIEF DESCRIPTION OF THE DRAWINGS

FIG. 9 (B) is a schematic view showing changes occurring in the hardness of the metal tip shown in FIG. 9 (A) when its components are varied;

DETAILED DESCRIPTION OF THE PREFERRED EMBODIMENTS

Figure 1:
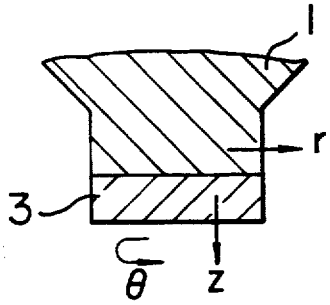
FIG. 1 PRIOR ART
FIGS. 1 and 2 are schematic views of the essential portions of a spark plug of the prior art in explanation of the principle of development of rupture in the metal tip thereof.
Figure 2:
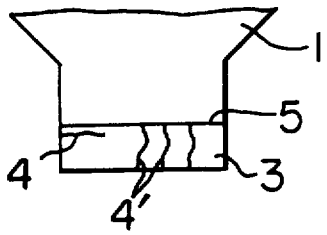
FIG. 2 PRIOR ART

FIGS. 1 and 2 show a spark plug of the prior art comprising a center electrode 1 having joined thereto by welding a metal tip 3 formed of the material which contains as a main component precious metal, such as platinum, or other metal of high resistance to heat and wear. As previously described, when this spark plug is subjected to low temperature and high temperature repeatedly, thermal stresses develop at surfaces of the center electrode 1 and the metal tip 3 at which they are welded together due to differences in the coefficient of thermal expansion. As shown in FIG. 1, the thermal stresses act in a radial direction r, a direction of rotation $\theta$ and an axial direction Z, so that an excessively high load is applied to the metal tip 3. Thus as shown in FIG. 2, the metal tip 3 is ruptured as indicated at 4 or ruptured along the surface at which welding is performed. This phenomenon has a higher incidence when changes in temperature occur repeatedly.

Figure 3:
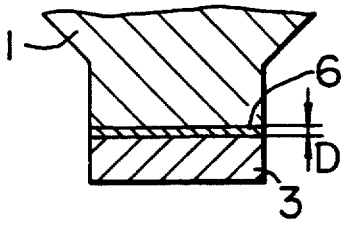
FIG. 3 is a schematic view of the essential portions of a spark plug in explanation of the principle of the invention.
Figure 4A:
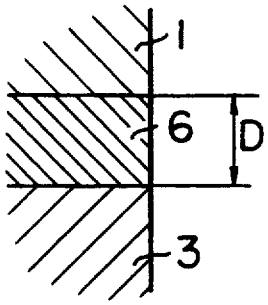
FIG. 4(A) and 4(B) are views showing changes in the components of the alloy layer formed in the spark plug shown in FIG. 3.
Figure 4B:
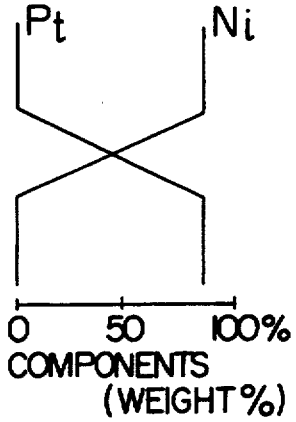

To cope with this problem, the inventors have carried out research and experiments and learned that by increasing the thickness D of an alloy layer 6 on surfaces 5 of the center electrode 1 and the metal tip 3 at which they are welded together as shown in FIG. 3. thermal stresses applied to the surfaces 5 can be reduced. The alloy layer 6 may have a composition such that when the metal tip 3 is formed of platinum, for example, platinum and nickel of a nickel base heat resistant alloy forming the matrix of the center electrode 1 continuously show changes in the direction of thickness of the alloy layer 6 as shown in FIGS. 4 (A) and 4 (B). The alloy layer 6 of this construction is effective to reduce thermal stresses applied to the metal tip 3, since it serves to reduce or absorb the differences in the coefficient of thermal expantion between the materials of the metal tip 3 and the center electrode 1.

The results explained hereinabove with reference to FIGS. 4 (A) and 4 (B) have been obtained on the metal tip 3 of platinum. However, they apply to other metal tips formed of heat and wear resistance metal of the base metal system.

The invention is based on the discovery explained hereinabove. More specifically, the spark plug for an internal combustion engine according to the invention has an alloy layer of a thickness of at least 10μ at a welding portion between a metal tip and the ignition section of at least one of the center electrode and the earth electrode. By virtue of this feature, it is possible to reduce thermal stresses applied to the metal tip due to differences in thermal expansion between it and the center electrode and/or the earth electrode and to avoid rupture of the metal tip adjacent to and along the surface thereof at which the metal tip is joined to the electrode, to thereby prolong the service life of the spark plug.

Figure 5:
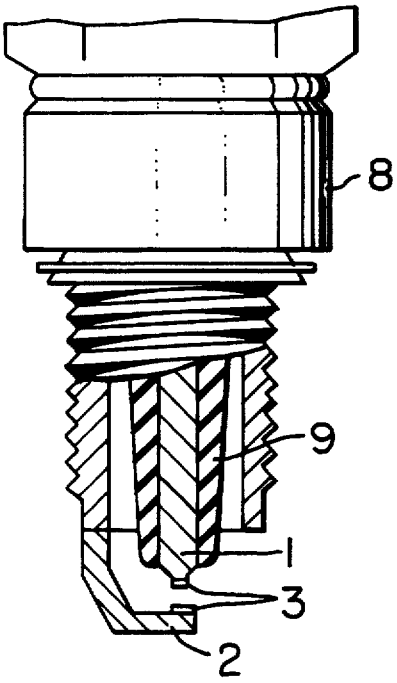
FIG. 5 is a side view, with certain parts being shown in section, of a spark plug for an internal combustion engine according to an embodiment of the invention.
Figure 6:
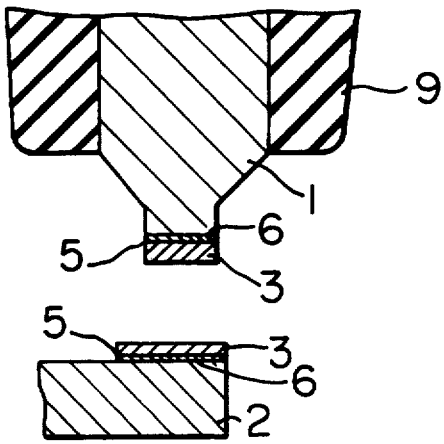
FIG. 6 is a sectional view of the spark plug shown in FIG. 5, showing a portion thereof on an enlarged scale.

FIGS. 5 and 6 show the spark plug for the internal combustion engine according to an embodiment of the invention. In the embodiment shown, metal tips 3 of disc shape are joined by resistance welding to an ignition section of the center electrode 1 and an ignition section of an earth electrode 2 respectively. *As can be seen in FIGS. 5 and 6, the disc shape metal tips have a diameter larger than a thickness of the metal tips. As also shown in those Figures, the center electrode has a reduced diameter, tapered end portion with a flat end and the metal tip is welded on that flat end.* Each of the metal tips 3 comprises 80% by weight of platinum and 20% by weight of iridium. In this embodiment, the alloy layer 6 between the center electrode 1 and the metal tip 3 and the alloy layer 6 between the earth electrode 2 and the metal tip 3 have their thickness increased a described hereinbelow so that they have a thickness of at least 10μ. In the figure, numerals 8 and 9 designate a fitting metal and an insulator respectively.

The process of increasing the thickness of the alloy layers 6 will be described. A spark plug of the construction shown in FIGS. 5 and 6 that has the alloy layer 6 not increased in thickness is allowed to stand for one hour in a vacuum furnace having a temperature set at 900° C., for example. The spark plug is taken out of the furnace and gradually cooled to room temperature in nitrogen atmosphere. When this process is adopted, a thermal diffusion phenomenon occurs in the step of holding the plug for one hour at 900° C., thereby increasing the thickness of the alloy layer 6 to 10μ. Control of the thickness can be readily effected by varying the temperature and time at which the plug is held in the vacuum furnace. For example, when it is desired to increase the thickness to 20μ, one should hold the plug at 900° C. for two hours. The results of the experiments conducted by the inventors show that by holding the plug in a vacuum furnace at 1000° C. for three hours, it is possible to have the thermal diffusion phenomenon to take place most preferably to produce an alloy layer of about 30μ in thickness.

Figure 7:
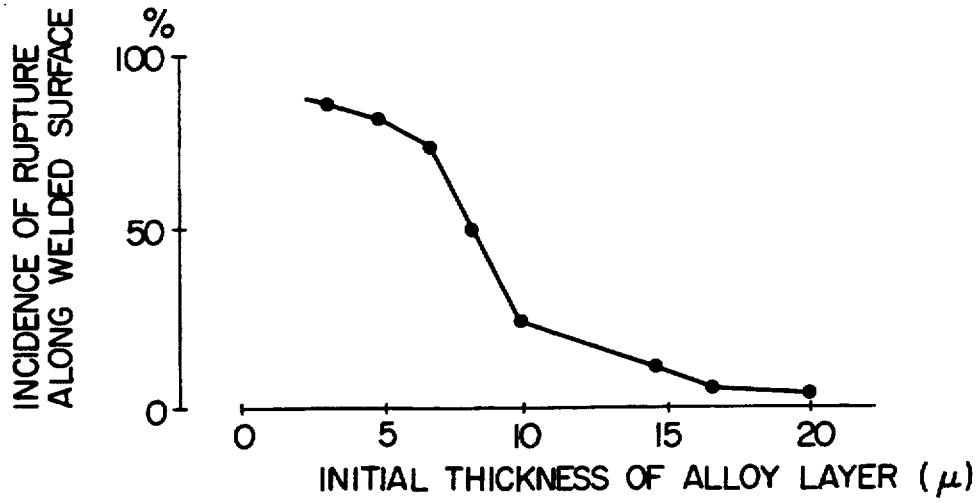
FIG. 7 is a diagrammatic representation of the relation between the thickness of the alloy layer formed in the spark plug and the incidence of rupture of a metal tip along the surface of the metal tip joined to the electrode.

The effects achieved by an increase in the thickness of the alloy layer will be described. FIG. 7 shows the relation between the initial alloy layer thickness and the incidence of rupture of the metal tip occurring along the surface of the metal tip at which the tip is welded to the electrode and on which the alloy layer is developed. The relation shown was established by experiments conducted by the inventors. In the experiments, the engine was operated to hold the spark plug alternately at high and low temperatures repeatedly for 3000 cycles, one cycle including the steps of holding it at 800° C. (center electrode temperature) for one minute and then holding it at 150° C. (center electrode temperature) for one minute. The engine used was of 4-cycle and 1500 cc water cooled type.

The spark plug had the following dimensions: the diameter of the forward end of the center electrode, 1.0 mm; and the precious metal tip (containing 80% by weight of platinum and 20% by weight of iridium) had a diameter of 0.7 mm and a thickness of 0.3 min. The center electrode was formed of the material containing copper as a core and an alloy of 93% by weight of nickel and the balance chromium, manganese and silicon forming a surface layer. Because the thickness of the alloy layer increases while the experiments are being performed, the value of the thickness shown in an initial value.

As can be clearly seen in FIG. 7, the incidence of rupture along the surface of the metal tip on which the alloy layer is joined shows a marked change after the thickness of the alloy layer exceeds 10μ. Thus it would be necessary for the alloy layer to have a thickness of at least 10μ and this value would be considered high enough to avoid the occurrence of rupture under substantially all the general engine operation conditions. When the spark plug is destined to operate under particularly harsh conditions, the alloy layer should have a thickness of at least 15μ. Although not shown in FIG. 7, it has been ascertained that the service life of the spark plug is increased markedly if the thickness of the alloy layer becomes 30μ.

The embodiment shown in FIGS. 5 and 6 comprises a metal tip formed of a binary alloy of platinum and iridium. The metal tip may also be formed of an alloy of the ternary system of platinum, iridium and nickel. As subsequently to be described in detail, the use of the Pt-Ir-Ni alloy for forming the metal tip has the effect of avoiding the rupture of the spark plug along the surface of the metal tip on which the alloy layer is joined. In the spark plug including the metal tip of the ternary system alloy, it is possible to avoid more advantageously the occurrence of rupture along the surface of the metal tip on which the alloy layer is joined, by giving a thickness of at least 10μ to the alloy layer interposed between the center electrode and/or the earth electrode and the metal tip. The effects achieved by the addition of nickel to the alloy forming the metal tip will be described in detail hereunder.

Figure 8:
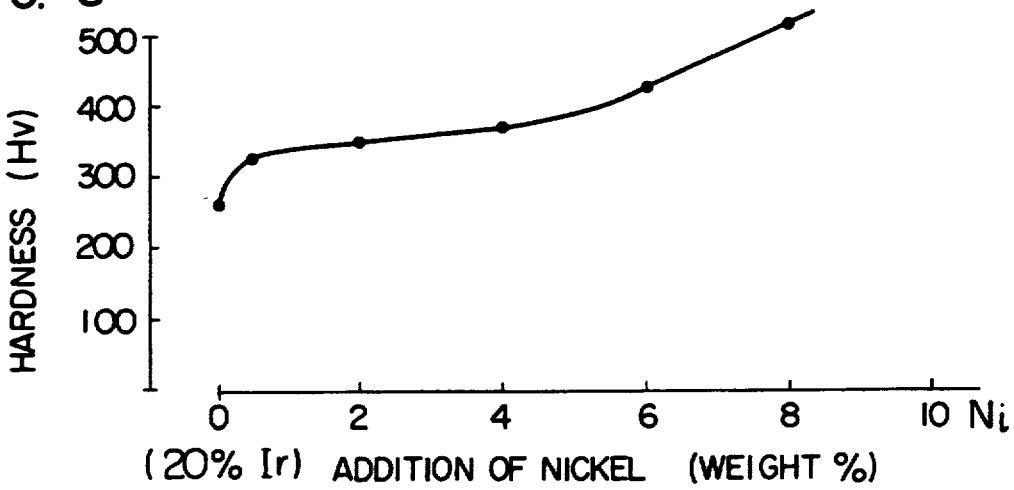
FIG. 8 is a diagrammatic representation of changes occurring in the hardness of the metal tip when nickel is added to the metal tip of an alloy of platinum-iridium.

FIG. 8 shows the results of tests conducted on a metal tip formed of precious metal containing 20% iridium, up to 10% nickel and the balance platinum, to determine the effect of the presence of nickel on the hardness of the alloy. Specimens of the spark plug used in the tests were of the W16EX type and had a metal tip formed of precious metal and having a diameter of 1.2 mm and a thickness of 0.2 mm joined by resistance welding to the earth electrode formed of an alloy containing 93% nickel and the balance chrominum, manganese and silicon.

As can be seen clearly in FIG. 8, an increase in the amount of nickel increases the hardness of the precious metal tip.

Figure 9A:
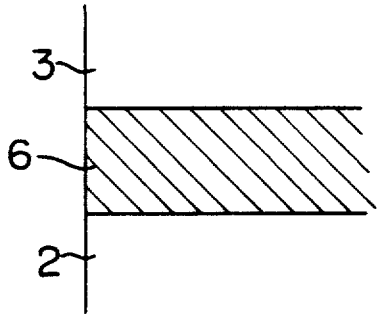
FIG. 9 (A) is a schematic view of the earth electrode, the alloy layer and the metal tip as arranged in the spark plug.
Figure 9B:
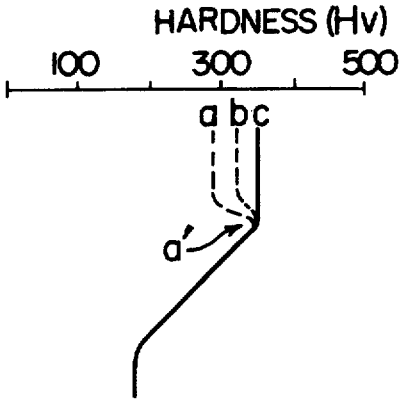

In FIG. 9 (A), the arrangement of the alloy layer 6 between the earth electrode 2 and the metal tip 3 of a spark plug of the W16EX type is shown, the precious metal tip 3 being joined by resistance welding to the earth electrode 2. FIG. 9 (B) shows the relation between the metal tip 3, alloy layer 6 and earth electrode 2 in hardness that is established when the composition of the metal tip 3 shown in FIG. 9 (A) is varied. In FIG. 9 (B), characteristic curves a, b and c represent a metal tip containing 2% nickel and the balance platinum, a metal tip containing 10% nickel, 20% iridium and the balance platinum and a metal tip containing 20% nickel, 20% iridium and the balance platinum respectively. As can be seen clearly in FIG. 9 (B), the characteristic curve a has a portion at which the hardness shows a sudden change or a hardness peak a'. However, as the characteristic curves successively transfer from curves a to b and then to c, the hardness park a' gradually disappears. The hardness peak has the action similar to a cutout effect on the thermal stresses developing at the jointing portion between the earth electrode 2 and the metal tip 3, and causes the rupture of the metal tip along the surface thereof at which the metal tip is jointed to the electrode. The hardness peak gradually disappears as described hereinabove as the characteristic curves a, b and c successively transfer from a to b and to c or as the amount of nickel added increases. This would be considered to show that an increase in the amount of nickel added to the metal tip causes rupture to difficulty develop along the surface of the metal tip at which the metal tip is welded to the electrode and on which the alloy layer is developed.

Figure 10:
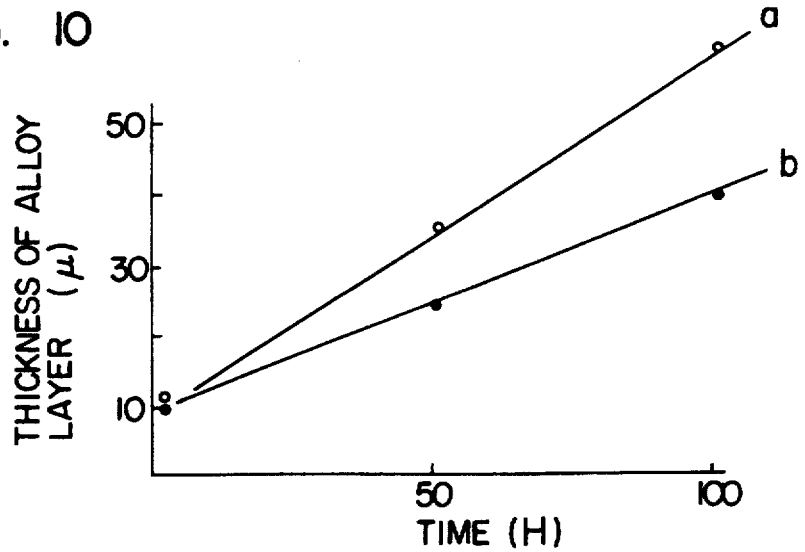
FIG. 10 is a diagrammatic representation of changes occurring during engine operation in the thickness of the alloy layer as the result of an addition of nickel to the metal tip.

FIG. 10 shows changes occuring during engine operation, in the thickness of the alloy layer 6 as a result of addition or no addition of nickel. In the experiments, specimens of a spark plug used included: (a) specimens having a precious metal tip of an alloy containing 20% iridium, nickel and the balance platinum joined by resistance welding to the earth electrode of a spark plug of the W16EX type (the dimentions being identical with those of the spark plug explained in relation to FIG. 8), and (b) specimens similar to those of (a) except that the precious metal tip was formed of an alloy containing 20% iridium and 80% platinum. In the tests, the spark plug was mounted on an engine of 1500 cc which was driven at 5400 rpm.

As can be seen in FIG. 10, the difference in thickness of the alloy layers between the two groups of specimens (a) and (b) increases with engine operation time, although it is hard to determine the factor responsible for this phenomenon. This would show that when the metal tip is formed of an alloy of ternary system or Pt-Ir-Ni, the thermal stresses developing from the difference in thermal expansion between the earth electrode and the precious metal tip are more readily absorbed by the cushioning action of the alloy layer than when the metal tip is formed of a binary alloy of Pt-Ir.

Figure 11:
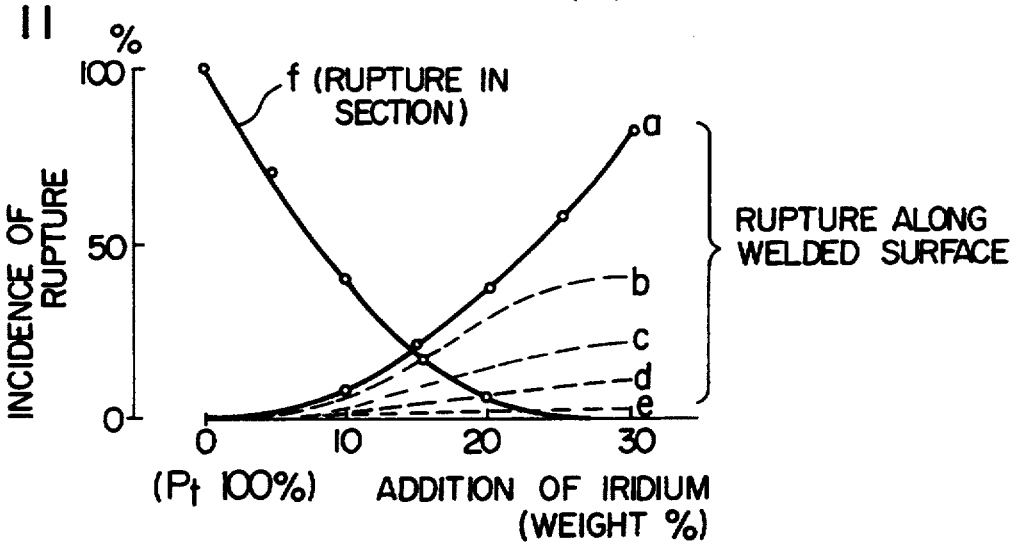
FIG. 11 is a diagrammatic representation of the relation between the incidence of rupture and the amount of iridium and nickel added to the metal tips of platinum-iridium and platinum-iridium-nickel.

In summary, the results of experiments shown in FIGS. 8–10 show that when the metal tip is formed of a ternary alloy of Pt-Ir-Ni, it is possible to prevent thermal stresses from exerting radical influences on the precious metal tip, so that occurrence of rupture along the surface of the metal tip at which the metal tip is welded to the electrode and on which the alloy layer is developed can be effectively avoided. FIG. 11 shows the results of cold-heat cycle tests conducted to corroborate the results of testes shown in FIG. 10. Specimens of the spark plug used in the tests of FIG. 11 were of the W16EX type including a metal tip joined to only the earth electrode by resistance welding. The tip had a diameter of 1.2 mm and a thickness of 0.2 mm. The cold-heat cycle tests were conducted to hold the spark plug alternately at high and low temperatures repeatedly for 3000 cycles, one cycle including the step of holding the spark plug at a high temperature of 1000° C. and a low temperature of 150° C. for one minute each. In the figure, a curve (a) represents a metal tip having no nickel added thereto and curves (b), (c), (d) and (e) represent metal tips containing, in weight percentage, 0.5% nickel, 5% nickel, 10% nickel and 20% nickel respectively.

As can be seen clearly in FIG. 11, addition of nickel has marked effects when the amount is in the range between 0.5 and 20%.

A curve (f) in FIG. 11 shows the relation between the incidence of rupture in section and the amount of iridium added in a metal tip formed of an alloy of platinum and iridium without addition of nickel. The rupture in section refers to the rupture shown at 4' in FIG. 2 or a rupture developing thicknesswise of the metal tip. As can be appreciated from the foregoing description, the thickness of the alloy layer 6 is increased according to the invention to avoid the rupture 4 shown in FIG. 2 that may otherwise occur along the surface of the metal tip on which the alloy layer is developed. By adding nickel to the alloy forming the metal tip 3, it is possible to render rupture increasingly difficultly developing along the surface of the metal tip on which the alloy layer is developed (See curves a to e in FIG. 11). Moreover, as can be seen from curves a to e, a reduction in the amount of iridium added to the metal tip 3 renders rupture difficultly developing along the surface of the metal tip on which the alloy layer is joined. As can be seen in curve f, a reduction in the amount of iridium added to the metal tip 3 tends to allow ruptures 4' in section (see FIG. 2) to occur. Thus, to avoid the development of both the rupture along the surface of the metal tip 3 on which the alloy layer is joined and the rupture in section, the amount of iridium added to the metal tip should be set at the range between 10 and 30%, more preferably the range between 20 and 30%.

As described hereinabove, the rupture occurring along the surface of the metal tip on which the alloy layer is joined can be effectively avoided if the amount of nickel in the metal tip is increased. However, if the amount of nickel in the metal tip rises above 10%, then the nickel would be oxidized and scattered in corrosive atmosphere by spark discharge, so that the resistance to wear would be reduced. Moreover, the hardness of the metal tip would increase, making working difficult to perform. Thus the amount of nickel is preferably in the range between 0.5 and 10 weight percent.

Figure 12:
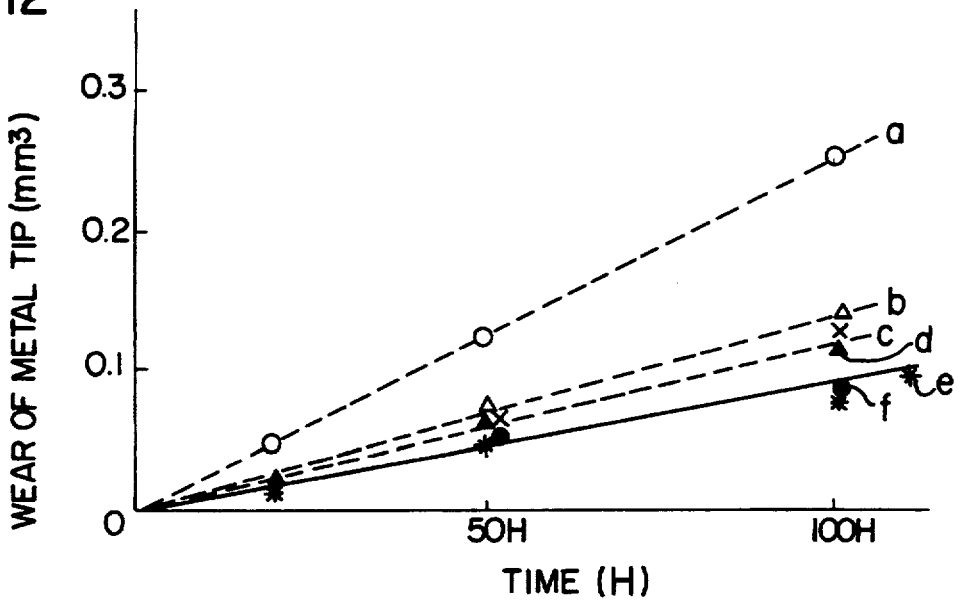
FIG. 12 is a diagrammatic representation of changes in the resistance of the metal tip to wear caused by addition of nickel.

FIG. 12 shows the results of evaluation of the metal tip of various composition with regard to its resistance to wear. In the figure, a, b, c, d, e and f represent a specimen containing 20% nickel and the balance platinum, a specimen containing, by weight percentage, 10% nickel and the balance platinum, a specimen containing 5% nickel and the balance platinum, a specimen containing 2% nickel and the balance platinum, a specimen only containing platinum and a specimen containing 20% iridium and the balance platinum. The dimensions of the metal tip and the type of the spark plug were substantially identical with those described by referring to FIG. 11. Similar results can be obtained when the platinum in the specimens a to e is replaced by 80% platinum and 20% iridium. The conditions under which the tests were conducted included: the temperature, 400° C.; the sparking times, 8000/min; and the atmosphere, air.

The results described hereinabove clearly show that the specimens of metal tip containing nickel added to the alloy containing 10–30% by weight of iridium and platinum difficulty develop rupture along the surface of the metal tip on which the alloy layer is developped. However, the resistance of the metal tip to wear tends to show an accelerated reduction with an increase in the amount of nickel added. Thus it would be considered that, to meet the conflicting requirements of increasing the resistance to rupture development and avoiding a reduction in the resistance to wear, the amount of nickel added to the metal tip is up to 10 weight percent. When a metal tip of an alloy of a ternary system containing platinum, iridium and nickel is used, it is possible to more advantageously avoid development of rupture along the surface of the metal tip on which an alloy layer is developped by providing between the metal tip and the center electrode and/or the earth electrode the alloy layer having the thickness of at least 10μ.

It has been ascertained that when metal tips of the aforesaid ternary system are used, it is advantageous that the metal tips contain 20% by weight of iridium, 2% by weight of nickel and the balance platinum. It has also been ascertained that whichever of the ternary metal tips and the binary metal tips may be used, it is possible to greatly prolong the service life of the spark plug by making the thickness of the alloy layer to 30μ.

While the invention has been described by referring to the preferred embodiments thereof, it is to be understood that the invention is not limited to the specific form of the embodiments and that many changes may be made therein without departing from the scope of the invention. Such changes may include the following modifications:

(1) The invention may be applied to a spark plug of the type in which the forward end of the earth electrode is opposed to the side of the center electrode.

(2) A metal tip may be welded to the center electrode or the earth electrode along.

(3) In the embodiment shown in FIGS. 5 and 6, an axial end of the center electrode is tapering, but tapering is not essential and the center electrode may be of substantially the same diameter along the length.

(4) The metal tip may be welded by laser welding or electron welding or joined by brazing.

(5) The metal tip may be convex in shape in place of being planar.

(6) The metal tip may be formed of other precious metal than platinum that is highly resistant to heat and wear, and of base metal that is highly resistant to heat and wear. It may be formed of an alloy of precious metals or base metals or an alloy of precious and base metals. The material of the metal tip may include a minuscule amount of other metal components (including incidental impurities). Stated differently, any material that differs from the material of the electrode in the co-efficient of thermal expansion and has high resistance to heat and wear may be used for forming the metal tip.

(7) Any material containing a nickel base metal as its matrix may be used for forming the center electrode and earth electrode. An alloy of 15% by weight of chromium, 8% by weight of iron and the balance nickel may be used.

From the foregoing description, it will be appreciated that according to the invention there is provided a spark plug capable of avoiding rupture of a metal tip of heat and wear resistivity joined by welding to the center electrode and/or the earth electrode that may otherwise be caused to occur during engine operation thereby prolonging the service life of the spark plug.

What is claimed is:

1. A spark plug for an internal combustion engine comprising:

a center electrode;

an earth electrode;

a metal tip joined by welding to an ignition section of one of said electrodes, said metal tip being highly resistant to heat and wear and formed of material differing in the co-efficient of thermal expansion from the metal forming said one electrode; and an alloy layer of the metals of said one electrode and said metal tip, said alloy layer being provided for reducing thermal stresses applied to said metal tip and located at a welding portion between said metal tip and said one electrode and having a thickness of at least about 10 μm.

2. A spark plug as claimed in claim 1, wherein said metal tip is formed of material containing about 10 to 30% by weight of iridium, and the balance of platinum and incidental impurities.

3. A spark plug as claimed in claim 1, wherein said metal tip is formed of material containing about 10 to 30% by weight of iridium, about 0.5 to 10% by weight of nickel, and the balance of platinum and incidental impurities.

4. A spark plug as defined in claim 1 including:

a metal tip joined by welding to an ignition section of the other of said electrodes, said metal tip being highly resistant to heat and wear and formed of material differing in the co-efficient of thermal expansion from the metal forming said other electrode; and an alloy layer of the metals of said other electrode and said metal tip, said alloy layer being provided for reducing thermal stresses applied to said metal tip and located at a welding portion between said metal tip and other electrode and having a thickness of at least 10 μm.

*5. A spark plug as claimed in claim 1, wherein said alloy layer comprises an alloy of platinum and nickel.*

*6. A spark plug as claimed in claim 1, wherein said alloy layer is formed by holding said welding portion between said metal tip and said one electrode in an atmosphere of predetermined temperature for a predetermined period.*

*7. A spark plug as claimed in claim 1, wherein said thickness is at least about 15 μm.*

*8. A spark plug as claimed in claim 1, wherein said metal tip has a surface welded to said ignition section of said one electrode and another surface facing the other of said electrodes through a gap.*

*9. A spark plug as claimed in claim 1, wherein said one electrode is a center electrode having a reduced diameter, tapered end portion with a flat end and said metal tip is welded on said flat end.*

*10. A spark plug as claimed in claim 1, wherein said metal tip has a disc shape.*

*11. A spark plug as claimed in claim 1, wherein said metal tip is made of precious metal and has a diameter larger than a thickness of said metal tip.*

*12. A spark plug as claimed in claim 4, wherein said one electrode is said center electrode, said other electrode is said earth electrode, and said metal tips face each other so that a spark gap is formed therebetween.*

*13. A spark plug as claimed in claim 12, wherein said center electrode has a reduced diameter, tapered end portion with a flat end and said metal tip is welded on said flat end.*

*14. A spark plug as claimed in claim 13, wherein said metal tip welded on said center electrode has a surface welded on said flat end and another surface facing said metal tip welded on said earth electrode so that said spark gap is formed.*

*15. A spark plug as claimed in any one of claims 1–14, wherein said thickness is an initial thickness.*

* * * * *